Dec. 10, 1968    G. K. STEVENS    3,415,539
AUXILIARY VEHICLE BODY FOR A TRICYCLE
Filed Feb. 3, 1967    2 Sheets-Sheet 2
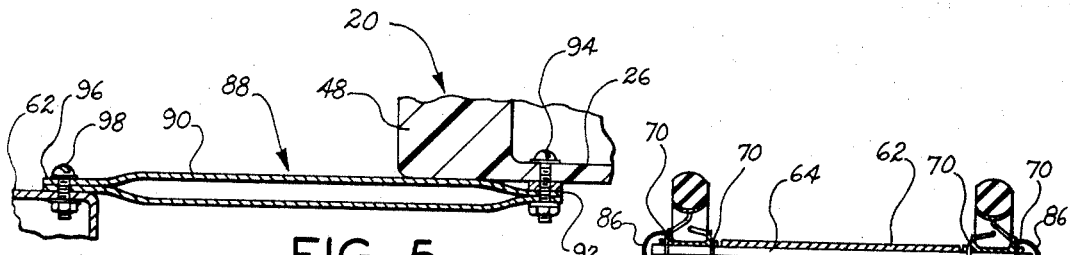
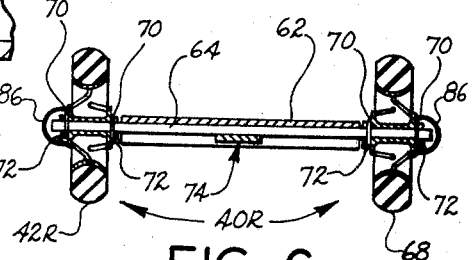
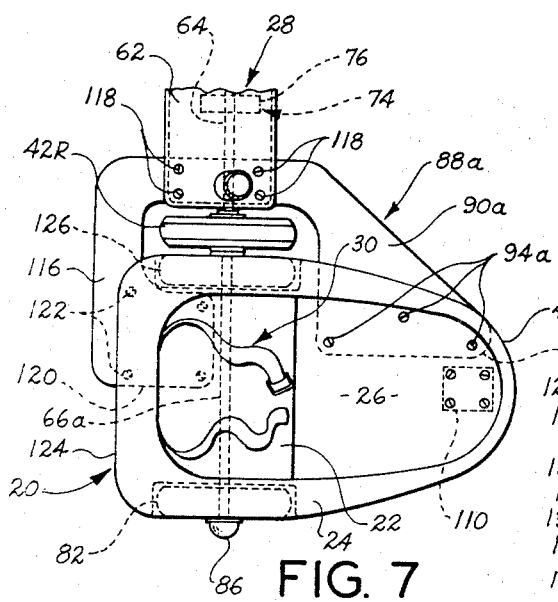
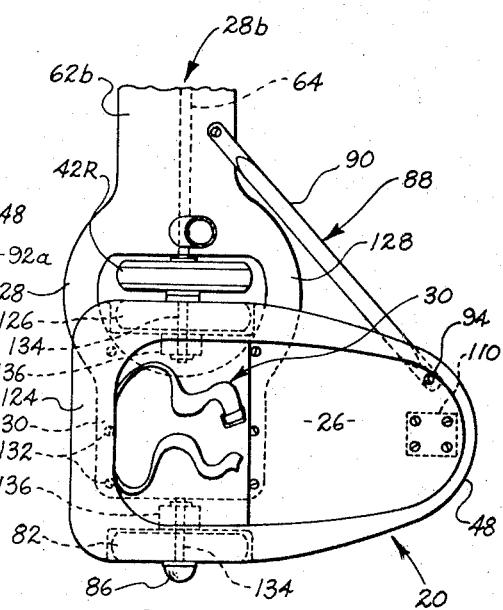
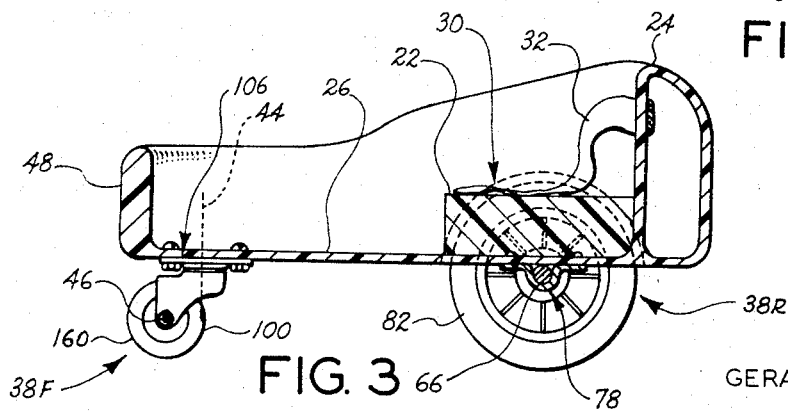
INVENTOR.
GERALD K. STEVENS United States Patent Office 3,415,539
Patented Dec. 10, 1968

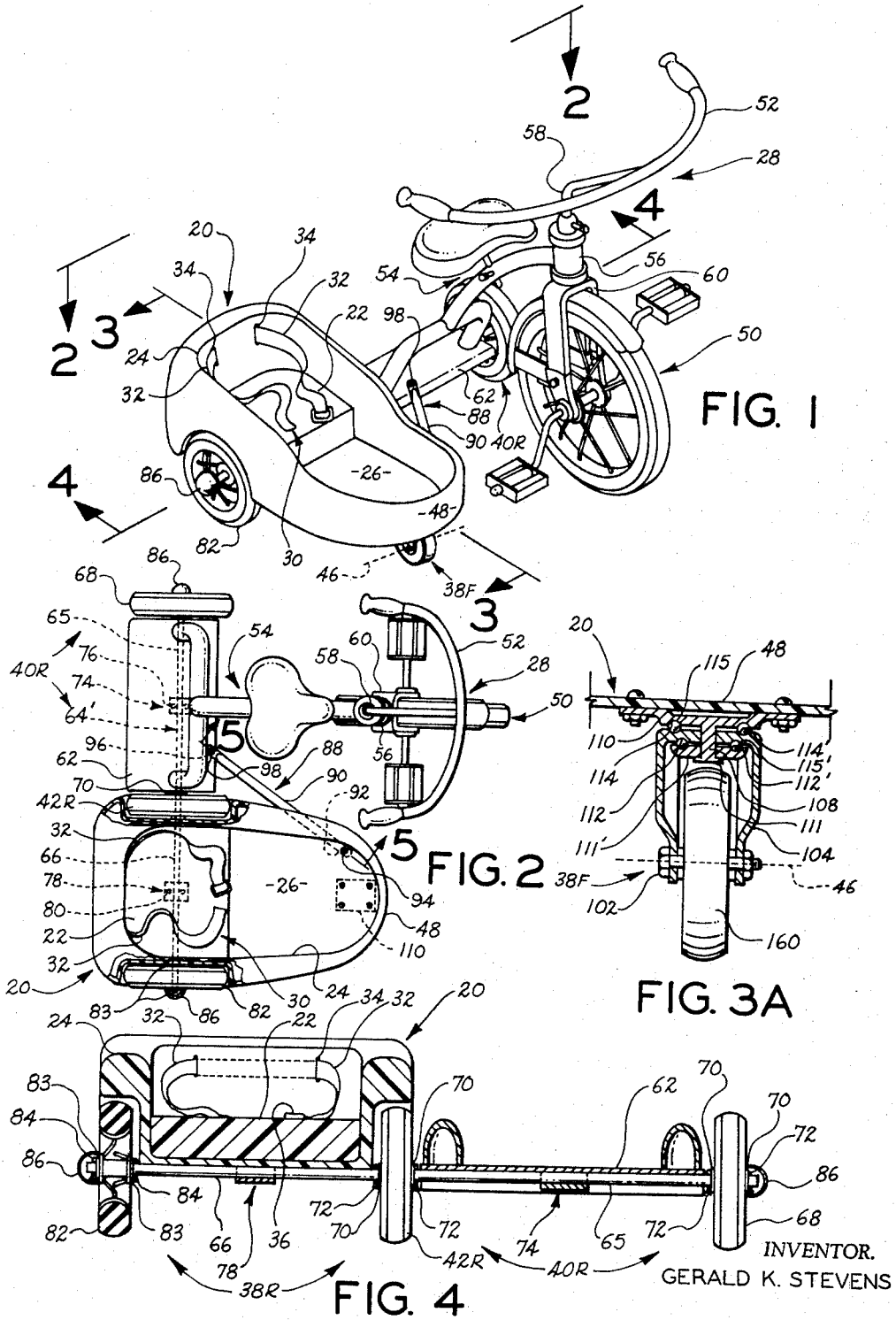

3,415,539
AUXILIARY VEHICLE BODY FOR A TRICYCLE
Gerald K. Stevens, 2000 Parkside Ave.,
Burbank, Calif. 91506
Filed Feb. 3, 1967, Ser. No. 613,927
10 Claims. (Cl. 280—203)

ABSTRACT OF THE DISCLOSURE

The specification discloses an auxiliary sidecar for a tricycle which can comprise a separate auxiliary unit or assembly adapted to be attached to a pre-existing conventional tricycle to convert it into a combination tricycle and sidecar assembly or which can be provided as a part of a tricycle at the time of original manufacture. The sidecar has rear wheel means mounted in coaxial relationship with respect to the rear wheel means of the tricycle and is provided with connection and coupling frame means adapted to rigidly hold the sidecar means in said position and in parallel, forwardly directed relationship to the tricycle, and is additionally provided with forwardly positioned caster-type front wheel means of a freely swiveling type, thus causing the sidecar to easily follow any type of turning or steering movement of the tricycle. In one form of the invention, the rear wheel means of the sidecar may be mounted on a common rear, interchangeable replacement axle means which also carries the rear tricycle wheel means after the shorter, initially provided rear axle of the tricycle is removed. In another form of the invention, the rear wheel means of the sidecar and the rear wheel means of the tricycle may be on separate axles which are still coaxially aligned, however. The connection and coupling frame, in one form of the invention, provides a substantially truss-type rigid connection between the sidecar and the tricycle, and thus makes it possible for the construction of the sidecar and the extended common axle to be of relatively lightweight material since it is not required to provide rigidity to the joined tricycle and sidecar assembly.

Generally speaking, the present invention relates to the velocipede and wheeled vehicle art and, more particularly, to such wheeled vehicles of the type conventionally known as tricycles, which have three wheels.

Such a conventional tricycle usually has a frame, a controllably steerable front wheel which is mounted with respect to the frame for turning or steering movement toward the left and toward the right around a substantially vertical steering axis of rotation, with said frame being provided at or adjacent to the rear thereof with a pair of transversely spaced rear wheels. All three of the wheels are mounted for rotation around horizontal axes of rotation which, in the case of the front wheel, is capable of directional displacement in a substantially horizontal plane when the front wheel is turned for steering purposes and which, in the case of the two rear wheels, is normally a common, transversely directed, horizontal axis of rotation since the two rear wheels are normally mounted in substantially parallel relationship with respect to each other in similar parallel, fixed, forwardly directed, vertical planes relative to the tricycle frame.

Such a tricycle normally has a seat for a driver of the tricycle carried by the frame at a convenient and substantially centered position with respect to the three wheels of the tricycle and usually is provided with a rear step platform mounted between the two rear wheels (usually over a rear wheel axle on which the two rear wheels are mounted, although not specifically so limited).

Such a conventional tricycle normally is provided with pedal means for foot operation in a manner such as to rotate at least one of the three wheels of the tricycle for propelling it along an underlying supporting surface. Usually, in most tricycles, there are two such pedal means and they are connected in 180-degree opposition to each other with respect to a central hub portion of the turnable or steerable front wheel of the tricycle. However, certain prior art tricycles have been provided with means for coupling the foot-operated pedal means with respect to one or both of the rear wheels for propelling the tricycle.

The novel auxiliary vehicle body means or compartment of the present invention may cooperate with either type of tricycle and is directed to the complete combination of the auxiliary vehicle body or compartment with a tricycle of either of the types just referred to, or any substantially functionally equivalent type, and also is directed to the novel auxiliary vehicle body or compartment apparatus per se, as distinguished from the combination thereof with such a tricycle or the like.

The auxiliary compartment apparatus of the present invention, in one preferred form thereof, may be said to comprise auxiliary vehicle body means defining and taking the form of an upwardly open hollow sidecar means having conveniently accessible seat means therein in which a driver of the tricycle may place any object which he wishes to take along with him as he rides the tricycle, or which may be employed as an extra seat in which another child may sit while the first-mentioned child drives the tricycle.

The sidecar means referred to above is provided with underlying ground-contactable rollable wheel means and rotative mounting means rotatively attaching same in underlying and supporting relationship with respect to the sidecar means so that it can support a relatively heavy load without imposing any stress on the tricycle to which said auxiliary sidecar means is effectively attached in laterally adjacent relationship.

Also, in one preferred form of the invention, said underlying wheel means carried by the sidecar means includes rear wheel means coaxially mounted with respect to the rear wheel means of the tricycle and, in certain forms, having one centrally positioned rear wheel common to both the tricycle and the sidecar means mounted on a common longitudinally extended rear axle which may, in effect, be said to have a first portion effectively comprising the rear axle of the tricycle and a second portion comprising a rear axle of the sidecar means. However, the apparatus of the present invention is not specifically limited to such an arrangement having a common centrally positioned rear wheel, but may include an arrangement wherein the sidecar means has a pair of rear wheel means separate and distinct from, and in addition to, the pair of rear wheel means of the tricycle and, in such an arrangement, either a common longitudinally extended single axle may be employed for mounting both pairs of rear wheel means, or two independent but coaxially aligned rear axles may be employed for this purpose.

In a preferred arrangement, the rear wheel means of both the tricycle and the sidecar means are coaxially related, and the sidecar means, in one preferred form thereof, is provided with an additional forwardly positioned caster-type wheel (usually a single centrally forwardly positioned wheel) mounted for swiveling rotation around a substantially vertical connection axis with respect to a forward central bottom portion of said sidecar means in addition to being mounted for horizontal rotation during rolling movement thereof along an underlying ground surface or the like.

The above-described arrangement makes it possible for the forward end of the sidecar means to easily turn and follow any turning movement of the tricycle itself produced by manual steering of the tricycle by turning the front tricycle wheel in either direction.

The apparatus of the present invention also includes what might be termed connection and coupling frame means for positively connecting the auxiliary sidecar means, and the underlying wheel means thereof, in the desired laterally adjacent relationship, with said rear wheel means of both the sidecar means and the tricycle usually being coaxially related as referred to hereinbefore.

In certain forms of the invention, said connection and coupling frame means may be of a type adapted to connect to the rigid frame of an entirely conventional preexisting tricycle after it has been manufactured so that the independently manufactured and separate sidecar apparatus of the present invention can be connected and coupled in the relationship described hereinbefore with respect to such a preexisting tricycle when desired and, conversely, can be disconnected and decoupled therefrom when desired, thus making it possible to use such a conventional preexisting tricycle in an entirely conventional manner or to use it in combination with the novel sidecar of the present invention according to the desires of the user.

In one version of the form of the invention mentioned above, wherein the sidecar apparatus is adapted to be attached to a preexisting conventional tricycle after the manufacture thereof and in a controllably detachable manner so that it can be connected and disconnected as desired, the conventional rear axle of the tricycle is removed and replaced with an extended longer replacement axis which will effectively comprise the previously mentioned common rear axis for the rear wheel means of both the tricycle and the auxiliary sidecar means with said rear wheel means comprising either the three rear wheel type referred to above or the four rear wheel type referred to above, and in this form of the invention the connection and coupling frame means may effectively comprise a truss type structure manually removably angularly connected between a forward portion of the auxiliary sidecar means and a rigid frame portion (such as the rear step platform portion) of the tricycle so as to provide a very rigid type of connection of the auxiliary sidecar apparatus with respect to the conventional preexisting tricycle frame. This form and arrangement of the apparatus of the present invention is customarily used when the conventional preexisting tricycle is of a type which has a rear axle for the rear tricycle wheels which can be easily removed from its mounted relationship with respect to the tricycle frame (usually the rear step platform thereof, although not specifically so limited).

However, there are a considerable number of prior art conventional preexisting tricycles which have the rear wheel axle nonremovably mounted with respect to the frame (usually the rear step pltaform portion thereof), such as by being welded or otherwise substantially permanently affixed thereto. Where the apparatus of the present invention is to be used in conjunction with such a preexisting conventional tricycle, the previously mentioned connection and coupling frame means may be of a somewhat different type adapted to provide sufficient connection and coupling rigidity despite the fact that the rear axle means or the rear rotative mounting of the underlying rear pair of wheel means of the auxiliary sidecar means is physically separate from the rear axle means of the conventional preexisting tricycle, although usually coaxially positioned with respect thereto. This is necessarily so because of the nonremovable nature of the rear tricycle axle in such an arrangement. Therefore, the previously mentioned connection and coupling means, in this form of the invention, normally will include either an integrally extended portion of the tricycle frame or an extra connection arm primarily adapted to effectively comprise a lateral extension of the rear portion of the tricycle frame and about the level of the rear step platform portion of the conventional preexisting tricycle frame so that the separate rear axle of the auxiliary sidecar means can be positively maintained in the proper parallel (and usually coaxial) relationship with respect to the rear axle of the tricycle.

It should be noted that the present invention is directed to both the combination of the tricycle and the sidecar apparatus and to the sidecar apparatus, per se, adapted for such cooperation with a tricycle or the like.

With the above points in mind, it is an object of the present invention to provide a new and novel combination of a child's tricycle and sidecar apparatus and to provide such sidecar apparatus, per se, for use in association with such a tricycle.

It is a further object of the present invention to provide sidecar apparatus as referred to herein of appropriate size to transport another child, one or more dolls, pets, or other objects or the like, from place to place.

It is a further object of the present invention to provide a structure that is extremely simple in design, functional in operation, and which provides complete safety in use in that it will not tip over because of the placement of the underlying wheel means supporting the sidecar means and which, because of this and the rigidifying connection and coupling means, provides a very strong structure which can be made of relatively lightweight construction.

It is a further object of the present invention, in one preferred form thereof, to provide apparatus of the character referred to herein which provides for the removal of an existing rear tricycle wheel axle and the installing in lieu thereof of an extended axle of sufficient length to permit the reinstalling of the conventional two rear tricycle wheels in their original positions and the mounting of the sidecar means over the extended portion of the axle, the securing of said sidecar means with an attaching bracket or the like to the extended portion of the axle, and the mounting of a third rear wheel identical to the existing two rear tricycle wheels at the outer end of the extended portion of the common rear axle. This provides three evenly spaced wheels across the common rear ends of the tricycle and the laterally adjacent sidecar means and thus provides entirely adequate support for both the tricycle and the sidecar means without the addition of heavy structural support members. The front of the sidecar means carries a free-wheeling, full-swivelled caster-type wheel which provides support for the front end of the sidecar means and provides for easy following movement of the front end of the sidecar means with respect to the tricycle during turning of the tricycle. This combination of the extended axle and additional wheel at the rear, plus the swivelled, caster-type wheel at the front, provides the proper support and balance and prevents the composite or combination vehicle from tipping over. The connection and coupling frame means which, in one form may be said to effectively comprise a guide bar, is attached from the foot platform of the tricycle to near the front of the sidecar means, thus providing truss type structure of great rigidity which, in combination with the front swivelled, caster-type wheel underlying the front end of the sidecar means, will cause it to follow perfectly any and all turning movements of the tricycle.

It is a further object of the present invention to provide apparatus of the character referred to herein having any or all of the advantages referred to herein, generically and/or specifically and individually or in combination, and which is of relatively inexpensive, foolproof, easy-to-mount and dismount construction, adapted for ready mass manufacture and suitable for cooperation with virtually all known types of tricycles whereby to be conducive to widespread use of the present invention, either as original equipment provided with a tricycle at the time of manufacture or as an individual kit or item sold separately from a conventional preexisting tricycle and adapted for attachment thereto subsequent to the manufacture of the conventional preexisting tricycle and which allows the tricycle to be used individually as a tricycle or in association with the sidecar means to comprise a combination or composite vehicle.

Further objects are implicit in the detailed description which follows hereinafter (which is to be considered as exemplary of, but not specifically limiting, the present invention), and said objects will be apparent to persons skilled in the art after a careful study of the detailed description which follows hereinafter, and all such implicit objects are intended to be included and comprehended herein as fully as if detailed with great particularity herein.

For the purpose of clarifying the nature of the present invention, several exemplary embodiments of the invention are illustrated in the hereinbelow-described figures of the accompanying drawings and are described in detail hereinafter.

FIG. 1 is a reduced-size, three-dimensional, pictorial, perspective view illustrating one exemplary embodiment of the present invention wherein one form of the sidecar apparatus is shown in mounted cooperative relationship with respect to a tricycle so as to effectively comprise a combination or composite vehicle which is capable of being driven about as a unit.

FIG. 2 is a fragmentary top plan view of the apparatus shown in FIG. 1 and clearly illustrates the fact that the initial short rear axle of a conventional tricycle has either been removed and replaced with the extended common rear axle, which functions are the rear axle for both the tricycle and the sidecar means, or that such an extended rear axle was provided at the time of original manufacture of the combination unit.

FIG. 3 is a fragmentary sectional view taken substantially along the plane and in the direction indicated by the arrows 3—3 of FIG. 1.

FIG. 3A is a fragmentary, enlarged, detailed, cross-sectional view illustrating the structure of the front wheel swivel mounting means.

FIG. 4 is a fragmentary sectional view taken substantially along the plane and in the direction indicated by the arrows 4—4 of FIG. 1.

FIG. 5 is a fragmentary, partially broken away, sectional view taken substantially along the plane and in the direction indicated by the arrows 5—5 of FIG. 2 and with portions of the apparatus substantially behind the plane of the section being eliminated from and not shown in this view for reasons of drawing simplification and clarity.

FIG. 6 is a fragmentary sectional view taken along a plane similar to the right portion of FIG. 4 and thus showing only the tricycle and is primarily for the purpose of illustrating the tricycle in its normal assembled relationship with a conventional rear axle only long enough to properly rotatively mount the two rear tricycle wheels. In other words, FIG. 6 illustrates the structure of the tricycle before the sidecar apparatus illustrated in the assembled relationship shown in FIGS. 1 through 5 is connected and coupled with respect to the tricycle or after it is disconnected and decoupled therefrom.

FIG. 7 is a fragmentary, top plan view similar in many respects to FIG. 2 but illustrates a slightly modified form of the invention wherein two coaxially positioned rear axles are employed for the rear pair of tricycle wheels and the rear pair of sidecar wheels.

FIG. 8 is a fragmentary view similar to FIG. 2 and also similar to FIG. 7, but illustrates a further modification of the invention wherein the rear step platform portion of the tricycle is provided at the time of original manufacture with a laterally extended portion comprising a part of a modified form of the connection and coupling frame means for mounting the sidecar means in the proper relationship with respect to the tricycle and wherein the tricycle has two rear wheels and the sidecar means is provided with two coaxially positioned rear wheels.

One first exemplary form of the invention, as illustrated in FIGS. 1–5, may be said to comprise an auxiliary vehicle body means, such as is generally designated by the reference numeral 20, which takes the form of and effectively defines an upwardly open hollow sidecar means, also generally designated by said reference numeral 20, having a conveniently accessible seat means 22 therein within the encircling side wall means 24 and having a lower foot-receiving portion or platform 26 positioned in front of the seat means 22 so as to be well adapted to receive a seated child therein, a toy, a doll, a pet, or any other object which a child may wish to place in the sidecar means 20 so that it will accompany him as he drives about on the tricycle, which is generally designated by the reference numeral 28.

The hollow sidecar means 20 may be provided with a seat belt 30 having outer portions 32 (which may actually be connected to each other in one form of the invention, although not so limited) suitably fastened to the sidecar means, such as by passing through slots 34 to positions exterior of the side wall means 24, or other suitable types of fastening means may be employed within the broad scope of the present invention. Inner ends of the seat belt means 30 may be provided with fastening buckle means or the like, one exemplary form of which is indicated by the reference numeral 36. This provides a convenient means for fastening a child in seated position within the sidecar means 20. However, it should be clearly understood that the invention is not limited to the specific seat belt means 30 illustrated or, indeed, to the use of any seat belt means at all.

The sidecar means 20 is provided with underlying ground-contactable, rollable wheel means and rotative mounting means for rotatively attaching same in underlying relationship with respect to the sidecar means 20. In the first exemplary form of the invention illustrated, said sidecar wheel means comprise rear wheel means 38R and front wheel means 38F.

In said exemplary first form of the invention illustrated, said rear sidecar wheel means 38R may be said to effectively comprise a pair of wheels transversely horizontally spaced apart and mounted in transversely related coaxial relationship with respect to the rear wheel means, generally designated at 40R, of the tricycle 28.

However, it should be noted that tht rear wheel means 38R of the sidecar 20 and the rear wheel means 40R of the tricycle 28 actually have a common central rear wheel 42R which may be said to effectively comprise part of a rear pair of wheels 38R of the sidecar means 20 and a pear pair of wheels 40R of the tricycle 28. Thus, it should be clearly understood that reference herein to said two pairs of rear wheel means, which seems to imply four wheels, is not limited to a four-wheel arrangement, although such will be described hereinafter in connection with the FIGS. 7 and 8 forms of the invention, but actually such two effective rear pairs of wheels are to be understood, when referred to herein, as comprising either three-wheel arrangement of the type illustrated in the first form of the invention shown in FIGS. 1–5 wherein the center rear wheel 42R is a common wheel and effectively comprises a part of each of said rear pairs of wheels 38R and 40R, or an arrangement wherein four rear wheels actually are used in a manner such as is exemplified in the FIG. 7 modification of the invention and also in the FIG. 8 modification of the invention, each of which will be described hereinafter.

The front sidecar wheel means 38F referred to above effectively comprises a forwardly positioned, caster-type wheel means mounted for swivelling rotation around a substantially vertical connection axis, such as is designated in broken lines at 44 in FIG. 3, in addition to being rotatably mounted for rotation around the horizontal axis 46, thus providing for convenient simultaneous turning movement of the forward or front end 48 of the sidecar means 20 when the steerable front wheel 50 of the tricycle 28 is correspondingly turned by twisting the handlebar means 52 of the tricycle 28.

In the exemplary first form of the invention illustrated, the tricycle 28, which may be of any substantially conventional type, has a main structural frame 54 which has a rotative mounting sleeve 56 which rotatably mounts the descending connecting rod 58 connected between the steering handlebar means 52 and the bifurcated yoke 60 which rotatably mounts the steerable front wheel means 50 for rotation around a horizontal axis of rotation which is displaceable, depending upon the position of the handlebar 52 as determined by a driver of the tricycle 28.

The tricycle frame 54 also includes a rear step or platform portion 62 which is normally provided with a rear axle member 64, as is best shown in FIG. 6, which is of a length just adequate to extend beyond each end of the step or platform member 62 to an extent such as to rotatively mount the conventional two rear wheels 68 and 42R at opposite ends of said axle 64 with appropriate washers 70 and retaining cotter pins 72 providing the proper mounting and retention of the wheels 68 and 42R thereon.

In one prior art type of tricycle, as illustrated in FIG. 6 independently, and as illustrated in FIGS. 1–5 after modification into the combination form of the invention, the rear wheel axle 64 is fastened underneath the step or platform portion 62 of the tricycle frame 54 by an appropriate fastening bracket or clamp, such as is generally designated at 74, which is bolted to the bottom of the step or platform member 62 by threaded fastener means 76. This acts to rotatively immobilize the axle 64 and to lock it in the proper position.

When the sidecar means 20 and associated apparatus of the present invention is to be connected and coupled with respect to the conventional tricycle 28 of FIG. 6 so as to assume the effectively unitary relationship illustrated in FIGS. 1–5, all that is necessary to do is to remove the cotter pins 72 from the ends of the conventional rear axle 64, and to loosen the fastening bolts 76 on the fastening clamp 74 so that the complete conventional rear axle 64 can be removed and can be replaced by the extended interchangeable replacement axle 64′ illustrated in the combination, effectively unitary form of the invention shown in FIGS. 1–5. It will be noted that said extended replacement axle 64′ is much longer than the original tricycle axle 64 and that a first portion 65 thereof, when passed through the two tricycle wheels 68 and 42R, with the appropriate washers 70 again in place and with the left cotter pin 72 again mounted in retaining relationship with respect to the left tricycle rear wheel 68, will still have an extended right portion 66 of the common axle 64′ which is now long enough to extend underneath the rear end of the sidecar means 20 and through a fastening clamp 78, adapted to be fastened by threaded fastener means 80, and outwardly to a position just beyond the outer side of the sidecar means 20 where an extra or outer wheel 82 may be positioned on the outer end of said extended outer portion 66 of the common axle 64′, with appropriate washer means 83 being mounted thereon and appropriate retaining cotter pin means 84 being positioned through a transverse aperture at the end thereof. Opposite ends of the extended common axle 64′, comprising the first portion 65 and the second portion 66, may be covered by end cap means 86 which may actually comprise the end cap means which originally covered the short rear axle 64 of the tricycle in its original individual or separate form as illustrated in FIG. 6.

The assembled or combination form of the invention may be provided with connection and coupling frame means for controllably attachable and detachable connection between the sidecar means 20 and the tricycle 28 in a manner such as to produce a very rigid interconnection therebetween so that the sidecar means 20 will at all times remain in true parallel, laterally positioned relationship with respect to the tricycle 28, irrespective of what type of movement the tricycle 28 is going through.

In the exemplary first form of the invention illustrated in FIGS. 1–5, said connection and coupling frame means is generally designated by the reference numeral 88 and may be said to comprise a rigid guide bar or tube 90 connected in a manner such as to define a truss type connection and coupling frame means between a forward portion 48 of the sidecar means 20 and the previously mentioned step or platform portion 62 of the frame 54 of the tricycle 28. In the example illustrated, this is provided by having a forward end 92 of said guide bar or rod 90 connected by threaded fastener means 94 to a bottom portion of the forward part 48 of the sidecar means 20 and by having a rear end 96 of said guide rod member 90 similarly connected by threaded fastener means 98 to the step or platform portion 62 of the tricycle 28 at a location substantially laterally offset from the other end 92, thus providing the truss type connection and coupling interconnection arrangement most clearly shown in FIG. 2.

The previously mentioned front sidecar wheel means 38F comprises a wheel 100 pivotally mounted by a horizontal axle or stud member 102 between opposite sides of the yoke member 104 which extends upwardly to a position above the wheel 100 and there is provided with swivel mounting means, such as is generally designated at 106, and which may be of any conventional type, although, in the example illustrated, it comprises a central stud portion 108 fastened by an upper fastening bracket portion 110 to the under surface of the front end 48 of the sidecar means 20 and which has rotatively mounted immediately above a lower retention disc 111 carried at the bottom of said stud member 108, a lower ball bearing, race-defining member 112 connected to the upper end of the yoke member 104 and positioned in opposition to an upper ball bearing race-defining portion 114 formed in said fastening bracket portion 110 with ball bearings 115 positioned in the circular raceway defined therebetween, and with additional ball bearings 115′ being positioned below the lower ball bearings race-defining member 112 in a lower pair of opposed ball bearing race-defining members or portions 114′ and 112′ between the members 111 and 111′, whereby to effectively rotatively mount the race-defining member 12 both above and below, by the upper ball bearings 115 and the lower ball bearings 115′, respectively, thus providing a very efficient type of swivel mounting means 106 but, as pointed out hereinbefore, not specifically limiting the invention to the particular swivel mounting means 106 illustrated and just described.

Of course, it should be understood that the tricycle 28 can be converted from its normal individual tricycle form as shown in FIG. 6 into a combination vehicle such as is shown in FIGS. 1–5 in the manner described hereinbefore and that, conversely, it can be again converted back into a separate, individually usable tricycle such as is illustrated in FIG. 6, by reversing the assembly procedure described hereinbefore—that is, by removing the extended rear axle 64′ including the two integrally connected axle portions 65 and 66, best shown in FIG. 2, and the coupling and connection member 88. This allows the complete sidecar means 20 to be removed. Then the shorter, conventional rear tricycle axle 64 can be replaced with respect to the step or platform member 62 and the two rear tricycle wheels 68 and 42R mounted thereon, thus returning the tricycle to its conventional, individual, separate form as illustrated in FIG. 6.

FIG. 7 illustrates a slight modification of the invention and shows it in a position generally similar to the showing of FIG. 2 of the first form of the invention. In the FIG. 7 modification, parts similar to those illustrated in the first form of the invention and which have not been modified are designated by the same reference numerals, and parts similar to those of the first form of the invention and which have been modified are designated by the same reference numerals, followed by the letter a, however. It will be noted that, in this modification, the connection and coupling frame means 88 of the first form of the invention has been substantially modified, including a forward portion 90a and an additional integral rear portion 116 adapted to be connected by the threaded fastener means or other functional equivalent, indicated at 118, to the step or platform portion 62 of the conventional tricycle and adapted to have its forward end 92a connected by several threaded fasteners 94a to a forward portion 48 of the sidecar means 20, and is adapted to have an outer end part 120 of the rear portion 116 connected by a number of threaded fasteners 122 to the underside of the rear end 124 of the sidecar means 20 in a manner which very firmly and rigidly connects the complete sidecar means 20 with respect to the step or platform portion 62 of the tricycle fragmentarily indicated at 28 and with the rear axle 66a in coaxial alignment with the rear axle 64 of the tricycle 28 but physically separate therefrom. Also, the inner end of said sidecar axle 66a is provided with an extra centrally positioned wheel 126 immediately adjacent to the rear tricycle wheel 42R. The primary reason for the arrangement illustrated in FIG. 7 is so the novel sidecar apparatus of the present invention can be mounted and dismounted with respect to a tricycle 28 which is substantially the same as the one shown in FIG. 6, but which has the rear axle 64 nonremovably mounted with respect to the rear step or platform member 62, such as by being welded thereto, for example, by having the bracket 74 firmly welded thereto rather than being merely clamped therearound. Also, the rear axle 64 may be welded at other locations or otherwise nonremovably mounted with respect to the platform member 62. Obviously, this would make it impossible to remove the short tricycle axle 64 and replace it with an extended common rear axle, such as shown at 64' in the FIGS. 1–5 combination form of the invention, and thus the aligned two rear axle arrangement and modified connection and coupling means illustrated at 88a in FIG. 7 overcomes this difficulty.

FIG. 8 illustrates a further modification of the invention wherein portions similar to those of the first form of the invention and which have not been modified are designated by the same reference numerals, and portions which are similar thereto but which have been modified are designated by similar reference numerals, followed by the letter b, however. In this modification, it will be noted that four rear wheels are adapted to again be used, thus requiring the two centrally positioned, physically separated wheels 42R and 126. Also, it will be noted that the rear step or platform member 62b is provided with an integral lateral extension thereof, including the circular bypass portion 128 which encircles the two wheels 42R and 126 and including the outer connection platform portion 130 which is adapted to be fastened by a plurality of threaded fasteners 132 to the bottom wall of the rear end 124 of the sidecar means 20, thus firmly connecting the rear end of the sidecar means 20 with respect to the step or platform portion 62b of the tricycle 28b.

Also, in this modification, it should be noted that the two rear wheels 126 and 82 underlying the sidecar means 20 are shown for purposes of variety as having only short stub shafts 134 extending into housing or bearing portions 136. However, they could have an axle extending clear across between said two wheels 126 and 82 in a manner similar to that shown at 66a in FIG. 7.

Also, in the FIG. 8 form of the invention, a truss-like guide rod or bar 90 similar to that shown in the first form of the invention illustrated in FIGS. 1–5 is similarly connected between the forward end 48 of the sidecar means and an inwardly displaced part of the platform or step portion 62b of the tricycle 28b, and since it is substantially identical to the corresponding element 90 of the first form of the invention, no further detailed description thereof is thought necessary or desirable.

It should be noted that the FIG. 8 form of the invention is adapted for manufacture as original equipment—that is, the manufacturer produces the complete assembled structure at the time of original manufacture, and the axle 64 may be of either the welded-in-place type or the bolted-on type, and, if desired, the two centrally positioned wheels 42R and 126 may be replaced by a single wheel, in which case the rear axle will correspondingly be laterally extended. Also, if desired, said rear axle may be extended clear across to carry the outer wheel 82, and in this case, the attachment platform portion 130 may be suitably formed to function as a bottom clamp for a central part of such an extended rear axle.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. An auxiliary vehicle compartment for a tricycle comprising: an auxiliary vehicle body means defining an upwardly open hollow sidecar means having conveniently accessible seat means therein, said auxiliary vehicle body means being provided with underlying ground-contactable rear-positioned rollable wheel means and rotative mounting means rotatively attaching same in underlying supporting relationship with respect to said auxiliary body means in transversely spaced, horizontally transversely aligned, coaxial, and substantially parallel relationship with respect to rear wheel means of a tricycle and further being provided with a forwardly positioned caster type front wheel means mounted for swiveling rotation around a vertical connection axis with respect to a forward underlying portion of said auxiliary body means and for rotation around a horizontal axis of rotation in addition to said swivel mounting around said vertical axis of rotation.

2. Apparatus as defined in claim 1, including connection and coupling frame means adapted to be connected between said auxiliary body means and a rear-positioned rigid frame portion of a tricycle in a rigid manner positively causing said auxiliary body means to rigidly maintain a predetermined longitudinally directed, laterally displaced, substantially parallel relationship with respect to a forward direction of the tricycle.

3. Apparatus as defined in claim 1, wherein said rear-positioned wheel means are provided with a horizontal transversely directed axle and rigid attachment means fastening a portion thereof to a bottom rear portion of said auxiliary body means in coaxial relationship with respect to rear wheel means of a tricycle.

4. Apparatus as defined in claim 1, wherein said rear-positioned wheel means are provided with a horizontal transversely directed axle and rigid attachment means fastening a portion thereof to a bottom rear portion of said auxiliary body means in coaxial relationship with respect to rear wheel means of a tricycle, said axle comprising a common interchangeable replacement axle means adapted to also rotatably carry rear wheel means of a tricycle.

5. Apparatus as defined in claim 4, wherein said common rear interchangeable replacement axle means comprises a longitudinally extended common axle member having a first portion of the proper length to replace a conventional shorter rear wheel axle of a tricycle and having a transversely extended second portion of the proper length to receive said rear-positioned underlying wheel means attached to and positioned under said rear portion of said auxiliary body means.

6. Apparatus as defined in claim 1, wherein said underlying rear-positioned wheel means includes an outer auxiliary wheel and an inner wheel actually comprising the laterally adjacent rear wheel of a tricycle, thus effectively comprising a pair of underlying rear-positioned wheel means supporting said auxiliary body means in transversely horizontally related relationship to a tricycle and together with the rear wheel means of the tricycle providing three horizontally spaced, coaxially mounted rear wheels with the middle rear wheel functioning as a common rear wheel for supporting both the auxiliary vehicle body means and the tricycle.

7. Apparatus as defined in claim 1, including in combination therewith a tricycle having a frame, a rotatable controllably steerable front wheel, pedal means for operating said front wheel, a pair of transversely horizontally spaced rear wheel means carried by a rear portion of said frame and rotatably mounted for rotation around a common horizontal axis of rotation, said rear portion of said tricycle frame being provided with rigid connection and coupling frame means rigidly connected to said auxiliary body means for mounting it in transversely spaced relationship at one side of said tricycle frame and with said rear-positioned underlying wheel means in said transversely spaced coaxial relationship with respect to said tricycle rear wheel means.

8. Apparatus as defined in claim 7, wherein said rigid connection and coupling frame means is provided with controllably attachable and detachable connection means for effective connection of said auxiliary body means in said transversely spaced adjacent relationship with respect to said tricycle and for controllable detachment therefrom when desired.

9. Apparatus as defined in claim 7, wherein said rigid connection and coupling frame means is integral with respect to said rear frame portion of said tricycle and comprises an integral lateral extension thereof adapted to carry a pair of said rear-positioned underlying wheel means for rollably supporting said auxiliary body means in addition to the carrying by the integral rear frame portion of said tricycle of said pair of rear tricycle wheel means, with all four of said rear wheel means being in transversely related coaxial relationship.

10. Apparatus as defined in claim 9, wherein said integral laterally extended connection and coupling frame means is provided with controllably engageable connection means for removable connection thereof with respect to a bottom portion of said auxiliary body means.

References Cited

UNITED STATES PATENTS

| D. 158,453 | 5/1950 | Glamb. | |
| 1,550,162 | 8/1925 | Hansburg | 280—203 |
| 1,624,915 | 4/1927 | Bennie | 280—203 |
| 2,494,707 | 1/1950 | Hill | 280—203 |
| 2,865,656 | 12/1958 | Musgrave | 280—203 |

FOREIGN PATENTS

Add. 45,651    8/1935    France.

KENNETH H. BETTS, *Primary Examiner.*